US007127982B2

(12) United States Patent
Garcia et al.

(10) Patent No.: US 7,127,982 B2
(45) Date of Patent: Oct. 31, 2006

(54) LINEAR DRIVE WITH NON-ROTATING PISTON

(75) Inventors: Vincent Garcia, Wantagh, NY (US); Michael Zona, Melville, NY (US)

(73) Assignee: Festo Corporation, Hauppauge, NY (US)

( * ) Notice: Subject to any disclaimer, the term of this patent is extended or adjusted under 35 U.S.C. 154(b) by 11 days.

(21) Appl. No.: 11/072,166

(22) Filed: Mar. 4, 2005

(65) Prior Publication Data

US 2006/0196354 A1 Sep. 7, 2006

(51) Int. Cl.
*F16C 29/04* (2006.01)
*F15B 15/00* (2006.01)

(52) U.S. Cl. ................................ 92/165 PR; 92/165 R

(58) Field of Classification Search .............. 92/165 R, 92/165 PR
See application file for complete search history.

(56) References Cited

U.S. PATENT DOCUMENTS 3,313,215 A * 4/1967 Bieri ........................ 92/165 R
4,442,759 A * 4/1984 Elser ...................... 92/165 PR
4,480,529 A * 11/1984 Winkler et al. ......... 92/165 PR
4,838,146 A * 6/1989 Stoll ...................... 92/165 PR
5,568,760 A * 10/1996 Volzer .................... 92/165 PR
6,129,003 A * 10/2000 Udagawa ................ 92/165 PR
6,536,327 B1 3/2003 Zona
6,755,115 B1 6/2004 Stoll et al.
6,766,727 B1 7/2004 Krafft et al.
6,931,982 B1 * 8/2005 Zajac et al. ............. 92/165 PR

FOREIGN PATENT DOCUMENTS

DE 442777 2/1996
EP 0346716 12/1989

* cited by examiner

*Primary Examiner*—Thomas E. Lazo
(74) *Attorney, Agent, or Firm*—Hoffmann & Baron, LLP

(57) ABSTRACT

A fluid power linear drive including a housing having an inner surface defining a piston receiving space, a piston reciprocally movable within the piston receiving space and a cooperative engagement means provided on the inner surface of the housing and an outer surface of the piston to prevent the piston from rotating relative to the housing. The cooperative engagement means may take the form of a projection means and a cooperating longitudinal groove, wherein the inner surface of the piston receiving space has the projection means extending radially inwardly into the piston receiving space and the piston has the groove cooperatively engaging the projection means for preventing the piston from rotating within the piston receiving space.

12 Claims, 5 Drawing Sheets

LINEAR DRIVE WITH NON-ROTATING PISTON

FIELD OF THE INVENTION

The present invention relates generally to pneumatic and hydraulic equipment, and more particularly to a linear drive device having a piston that is prevented from rotating with respect to the device.

BACKGROUND OF THE INVENTION

Linear drive units or double acting cylinders are known in the art for imparting linear reciprocating motion for driving a power transmitting member or the like. Such devices typically include an elongated fluid power cylinder housing in which a piston is arranged able to be slid by fluid actuation in a longitudinal direction. Usually, the piston is connected with a piston rod extending out of a front end of the cylinder housing, which in turn is coupled to a power transmitting member.

In such devices, the piston and piston rod are commonly circular in cross-section and are slidingly seated in a circular bore and/or bushing of the cylinder housing. Due to their circular design, it is possible for these pistons and piston rods to rotate to some extent during operation. However, in certain applications, it is desired or necessary to prevent the piston and/or piston rod from rotating as it linearly traverses.

One method by which conventional drive units accomplish this goal is by utilizing non-circular pistons and/or piston rods seated in correspondingly sized bores or barrels, whereby the piston and/or piston rod is prevented from rotating by its non-circular geometry. Typical non-circular geometries include square and elliptical cross-sections. For example, EP 0346716 discloses an actuator unit having a non-circular piston rod prevented from rotating by a bearing component fastened to the outside of the cylinder housing.

Another method for preventing rotation of the piston involves the use of one or more guide rods which are connected in parallel with the piston and/or piston rod and slidingly traverse in a separate bore spaced apart from the main piston chamber. The guide rods are generally fixed to the piston by a yoke plate which prevents the piston from rotating.

However, such methods are not without their drawbacks. For example, non-circular piston rods have limited torque and are difficult to seal at sharp corners to protect against contamination and other environmental influences. It is also more expensive to manufacture high-precision non-circular pistons and piston rods from hardened stainless steel rod material, as compared to circular pistons and piston rods. It is also often difficult to precisely match non-circular pistons with mating complex geometrical bores or barrels. With respect to the use of guide rods, such external guide rods can easily bind and further require the device to overcome higher frictional forces during operation. Moreover, guide rods mean additional parts and extra space is required on the device to accommodate the guide rods and yoke plate.

Accordingly, it would be desirable to maintain a standard circular piston and piston rod within a linear drive yet prevent the circular piston from rotating without the need for guide rods. It would be further desirable to provide a compact linear drive unit that utilizes a minimum number of inexpensive components to prevent the piston from rotating.

SUMMARY OF THE INVENTION

The present invention is a fluid power linear drive including a cylinder housing having an inner surface defining a piston receiving space, a piston reciprocally movable within the piston receiving space and a cooperative engagement means provided on the inner face of the piston receiving space and an outer surface of the piston for preventing the piston from rotating relative to the housing. The cooperative engagement means may be provided in the form of a projection means and a cooperating groove, wherein the inner surface of the piston receiving space has a projection means extending radially inwardly into the piston receiving space and the piston has a longitudinal groove engaging the projection means for preventing the piston from rotating within the piston receiving space. Alternatively, the projection means may be provided on the piston and the cooperating groove may be formed in the housing.

In a preferred embodiment, the longitudinal groove is defined by a bottom wall and two side walls extending from the bottom wall and is formed in the piston between two longitudinally spaced seals provided on the piston. Also, the projection means is preferably a ball press-fit within a hole formed in the inner surface of the piston receiving space, wherein the ball engages the piston groove. Alternatively, the projection means can be a pin fixed within a hole formed in the inner surface of the piston receiving space, or a raised portion integral with the inner surface of the piston receiving space.

In an alternative embodiment, the fluid powered linear drive includes a cylinder housing defining a piston receiving space and a piston rod receiving space, a piston reciprocally movable within the piston receiving space and a piston rod axially connected to the piston for reciprocal movement therewith. The piston rod receiving space has an inner surface with a protuberance or projection means extending radially into the piston rod receiving space. The piston rod extends through the piston rod receiving space and has a longitudinal groove engaging the projection means for preventing the piston rod from rotating within the piston rod receiving space. In this embodiment, the cylinder housing may also include a piston rod bearing which defines the piston rod receiving space therein and wherein the piston rod extends longitudinally outwardly from the housing.

The present invention further involves a method for guiding a piston reciprocally movable within a piston receiving space of a fluid powered linear drive cylinder housing. The method generally includes the steps of providing a radially extending projection means on one of an inner surface of the housing piston receiving space and an outer surface of the piston and cooperatively engaging the projection means with a longitudinal groove formed on the other of the inner surface of the housing piston receiving space and the outer surface of the piston for preventing the piston from rotating within the piston receiving space.

The preferred embodiments of the linear drive with a non-rotating piston as well as other objects, features and advantages of this invention, will be apparent from the following detailed description, which is to be read in conjunction with the accompanying drawings.

DETAILED DESCRIPTION OF THE PREFERRED EMBODIMENTS

Figure 1:
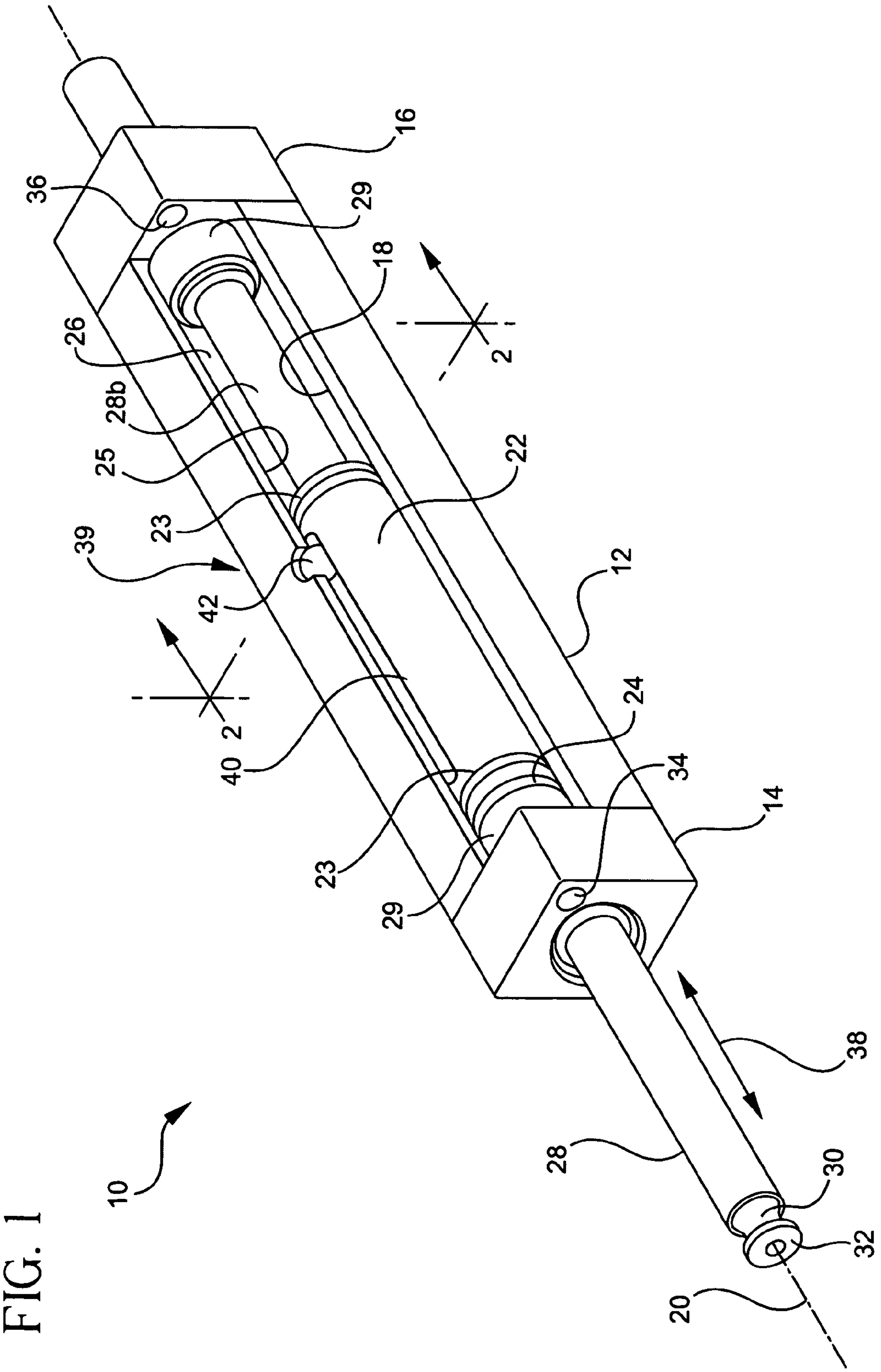
FIG. 1 is a top perspective view of a linear drive with non-rotating piston, formed in accordance with a preferred embodiment of the present invention, with the housing shown partially cut away.
Figure 2:
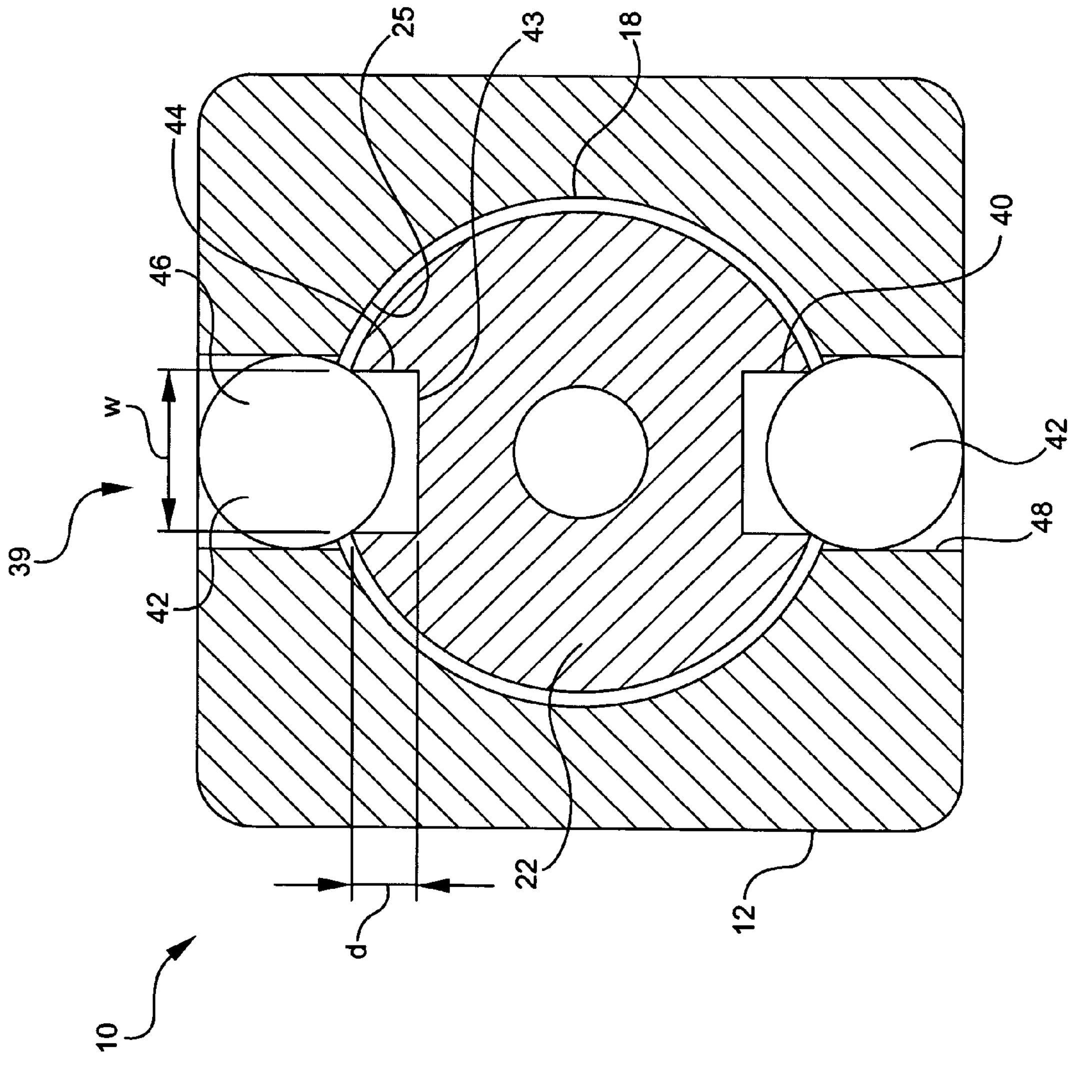
FIG. 2 is a cross-sectional view of the linear drive shown in FIG. 1, taken along line 2—2.

Referring first to FIGS. 1 and 2, the fluid power linear drive device 10 of the present invention generally includes an elongated cylinder housing 12 and a front and a rear housing cover 14 and 16. The cylinder housing 12 is preferably a tubular body of any external geometry extruded from a durable metal material. The housing covers 14 and 16 are respectively mounted on the front and rear end faces of the cylinder housing 12 and secured thereto, for example, using bolts or by ties.

The cylinder housing 12 defines a piston receiving space 18 extending in the interior of the housing in the longitudinal direction 20. This piston receiving space 18 has a generally circular cross-sectional configuration and extends between the two end faces of the cylinder housing 12. The piston receiving space 18 is closed at the ends by the housing covers 14 and 16.

A piston 22, which is able to be reciprocally slid in the direction of the longitudinal axis 20 of the cylinder housing 12, is located in the piston receiving space 18. The piston 22 has a generally circular cross-sectional configuration and divides the piston receiving space 18 into a front working space 24 adjacent to the front housing cover 14, and a rear working space 26 adjacent to the rear housing cover 16. The piston 22 is provided with seals 23, such as O-rings or any other known seal arrangement, which cooperate with the inner surface 25 of the piston receiving space in a sealing, fluid-tight manner.

A piston rod 28 is preferably permanently connected with at least one end of the piston 22 and extends coaxially with the piston. The device 10 shown in FIG. 1 is a double-acting cylinder wherein the piston 22 has one piston rod 28 extending from the front of the piston through the front working space 24 and through the front housing cover 14 and another piston rod **28*b* extending from the rear of the piston through the rear working space 26 and through the rear housing cover 16. The piston rods 28 and 28*b* are preferably slidingly supported by bearings 29 fixed within the piston receiving space 18 or within respective housing covers 14 and 16. The ends 30 of the piston rod 28 are disposed outside the cylinder housing 12 and may be provided with attachment means 32**, such as a screw thread or the like, which permits attachment to an object to be moved by the linear drive device.

The cylinder housing 12 is further formed with front and rear fluid ducts 34 and 36, which are in respective fluid communication with the front working space 24 and the rear working space 26 of the piston receiving space 18. The front and rear fluid ducts 34 and 36 may, for example, be longitudinally formed in the front and rear housing covers 14 and 16, respectively, as shown in FIG. 1, or the ducts may be formed perpendicularly through the wall of the cylinder housing 12. Of course other arrangements and combinations thereof can be utilized so long as each of the front and rear working spaces 24 and 26 is provided with a fluid duct.

By way of the fluid ducts 34 and 36, connected to fluid lines (not shown), an actuating fluid, such as compressed air, is alternately supplied and exhausted from the working spaces 24 and 26. Operation utilizing a hydraulic fluid is also contemplated by the present invention. As a result of such fluid action in the working spaces 24 and 26 and, in turn, on the piston 22 dividing the working spaces, there is a linear movement of the piston and the piston rod 28 in one direction or the other along the longitudinal axis 20 indicated by a double arrow 38 shown in FIG. 1.

According to the present invention, the circular piston 22 is prevented from rotating within the piston receiving space 18 by providing a cooperative engagement means 39 on the outer surface of the piston and the inner surface 25 of the piston receiving space 18. In a preferred embodiment, the cooperative engagement means 39 is in the form of at least one longitudinal channel or groove 40 formed in the outer surface of the piston, which receives a protuberance or projection means 42 provided on the inner surface 25 of the piston receiving space. It is envisioned that the projection means 42 and the groove 40 can take any geometry, so long as they cooperate to prevent rotation of the piston upon longitudinal translation within the cylinder housing 12.

Referring additionally to FIG. 2, the longitudinal groove 40 preferably has a depth "d" and a width "w" and is preferably defined by a bottom wall 43 and side walls 44 extending from the bottom wall. The groove 40 is preferably formed by milling to a precise width "w" and extends longitudinally between the seals 23 of the piston 22. By positioning the groove 40 between the seals 23 of the piston 22, the groove will not provide a leak path for fluid in the working chambers 24 and 26. The piston 22 shown in FIG. 2 is formed with two longitudinal grooves 40 formed in opposite radial surfaces of the piston, however, other configurations are of course possible.

The projection means 42 provided on the inner surface 25 of the piston receiving space 18 can take any form so long as it protrudes to some extent inwardly from the inner face into the piston receiving space. In a preferred embodiment, the projection means is a hardened ball bearing 46 press-fit within a hole 48 formed in the cylinder housing 12, as shown in FIGS. 1 and 2. The ball bearing 46 is pressed into the hole 48 to a depth wherein the ball engages the aligned groove 40 formed in the piston. Thus, the outer surface of the ball bearing 46 will contact the side walls 44 of the groove 40 and will restrict all possible rotational motion of the piston 22, but will permit longitudinal reciprocation. The ball bearing 46 is preferably fixed within the cylinder housing 12 so there will be a sliding, as opposed to a rolling, friction between the ball and the piston groove 40.

Figure 4:
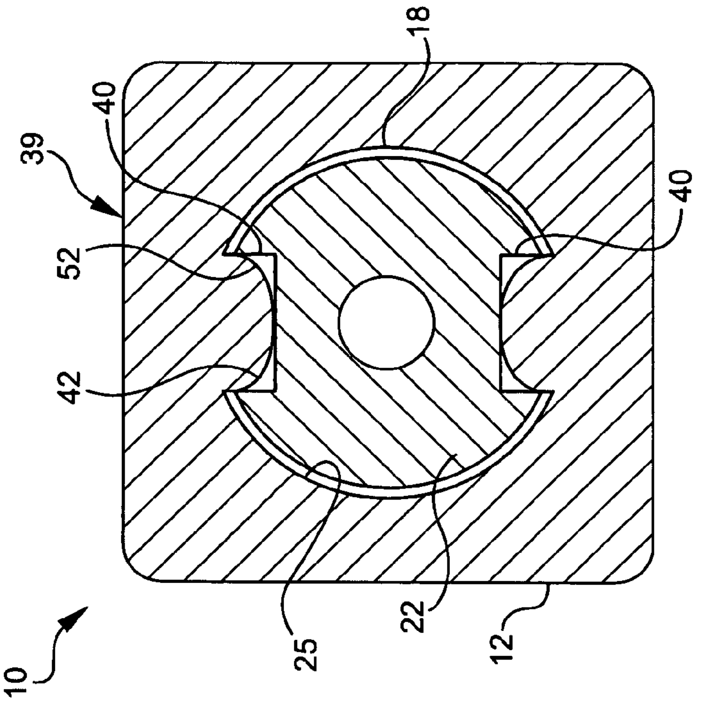
FIG. 4 is a cross-sectional view of another alternative embodiment of the present invention.
Figure 3:
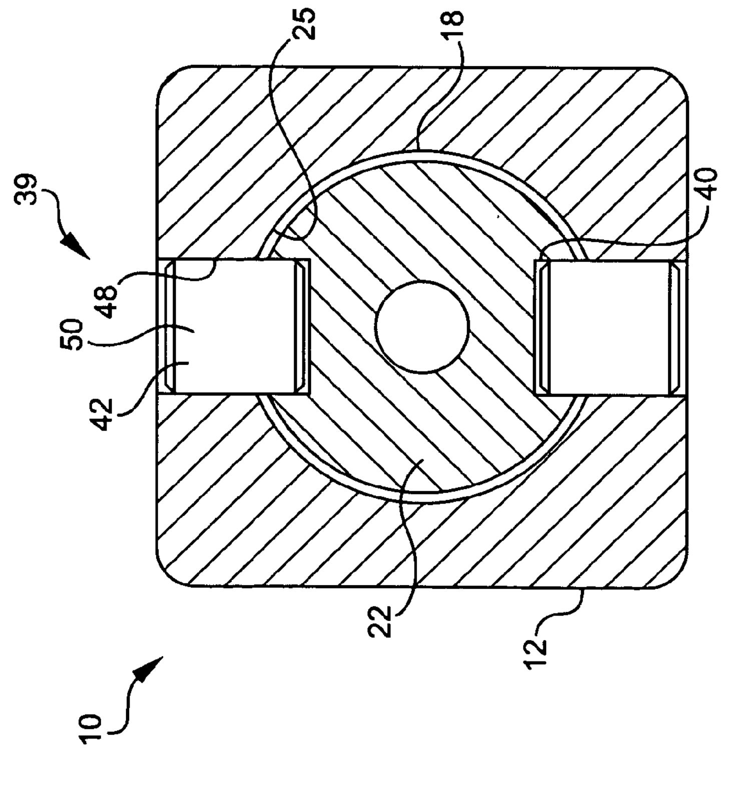
FIG. 3 is a cross-sectional view of an alternative embodiment of the present invention.

As mentioned above, the projection means 42 can take other forms. For example, FIG. 3 shows the projection means 42 in the form of a pin 50 press-fit within the hole 48 formed in the cylinder housing 12. The pin 50 is pressed into the hole 48 to a depth wherein the pin sides engage the aligned groove 40 formed in the piston. In FIG. 4, the protuberance 42 is a raised portion 52 integral with the inner surface 25 of the cylinder housing 12. The integral raised portion 52 has a height sufficient to engage the aligned groove 40 formed in the piston. Again, in each embodiment, the projection means 42 will restrict all possible rotational motion of the piston 22 but will permit longitudinal reciprocation. Also, the projection means 42 is preferably fixed within the cylinder housing 12 so there will be a sliding friction with the piston groove 40.

Figure 5:
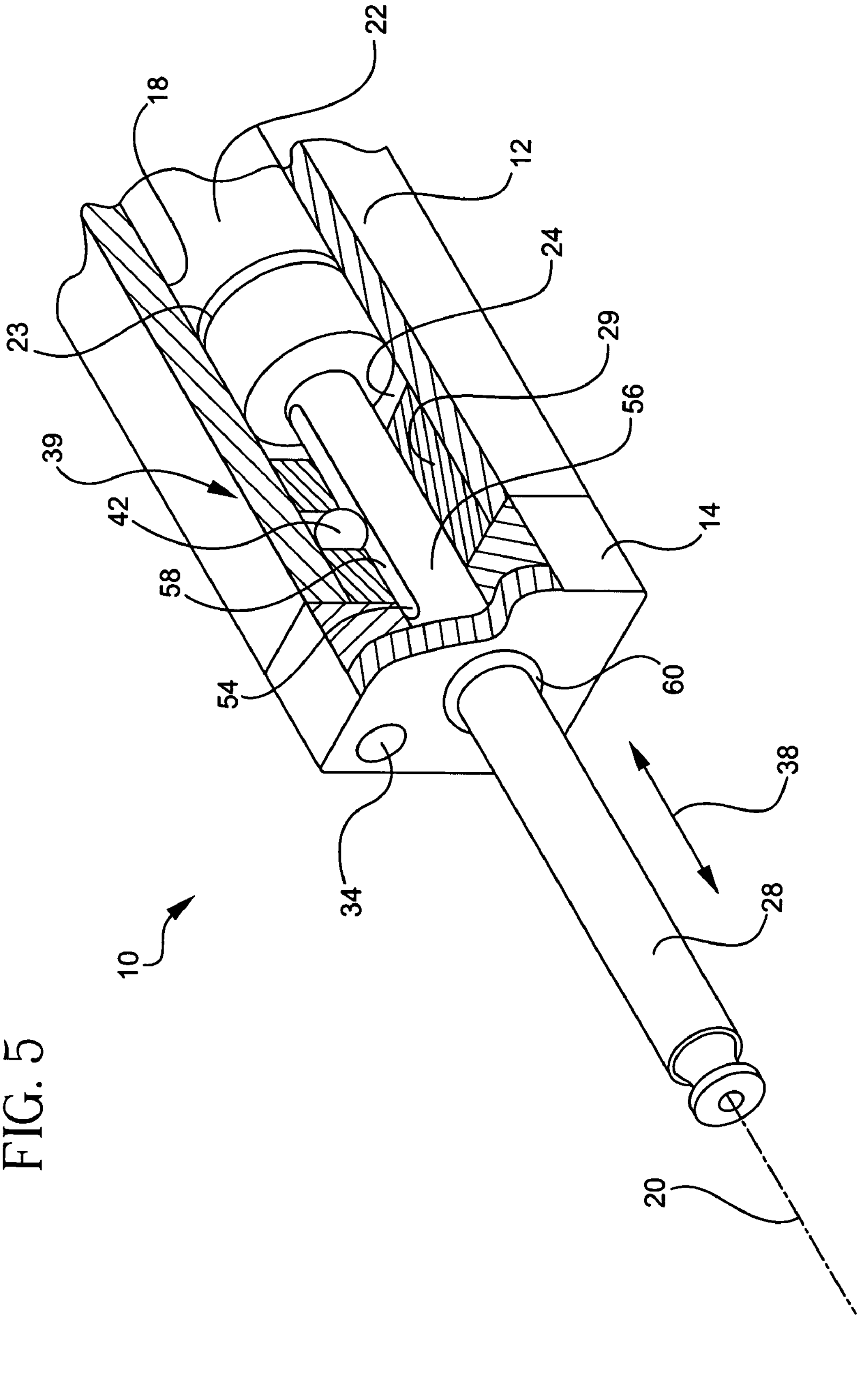
FIG. 5 is a top perspective view of yet another alternative embodiment of the present invention.

In another alternative embodiment, as shown in FIG. 5, the piston rod 28, as opposed to the piston 22, can be formed with a groove or channel 54. In this case, a projection means 42 can be provided on an inner face 56 of a piston rod receiving space 58 defined by the piston rod bearing 29. In this regard, the front housing cover 14 would be provided with a seal 60 which cooperates with the outer surface of the piston rod 28 in a sealing, fluid-tight manner. As previously described, the projection means 42 may take any form so long as it engages the groove 54 formed in the piston rod 28 to restrict the piston 22 and piston rod from rotating.

Figure 6:
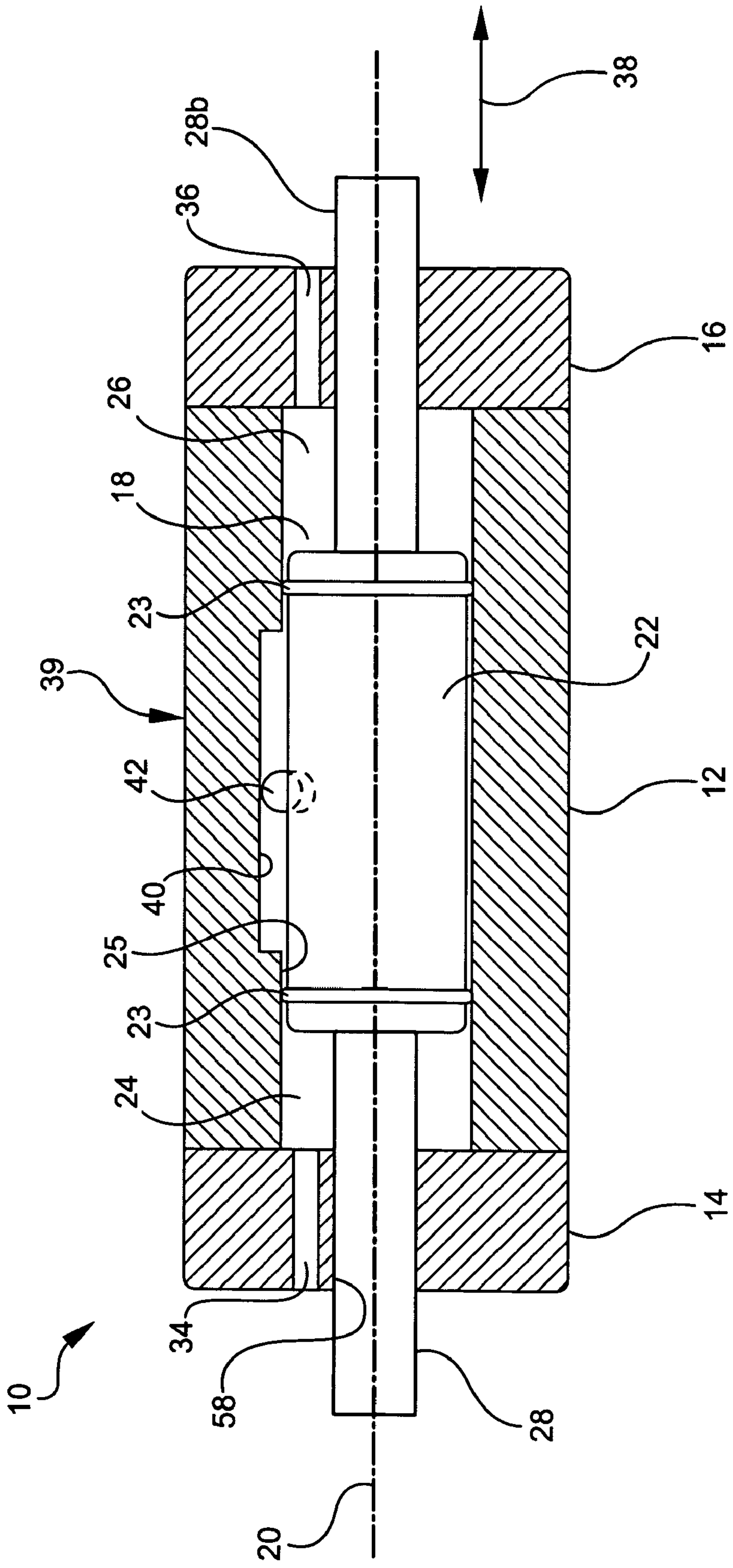
FIG. 6 is a longitudinal cross-sectional view of still another alternative embodiment of the present invention.

In still another alternative embodiment, the projection means 42 may be provided on the piston 22 while the longitudinal groove 40 is formed in the inner surface 25 of the piston receiving space, as shown in FIG. 6. It is further envisioned that this reverse engagement means arrangement can also be provided on the piston rod 28 and the piston rod receiving space 58.

As a result of the present invention, a simple, low-cost solution is provided for the problem of preventing a piston from rotating. The present invention allows the piston and piston rod to be fabricated with circular cross-sections, which provides strength and sealing benefits, while at the same time requires a minimum of additional components, such as guide rods.

Although the preferred embodiments of the present invention have been described with reference to the accompanying drawing, it is to be understood that the invention is not limited to those precise embodiments, and that other changes and modifications may be made by one skilled in the art without departing from the scope or spirit of the invention.

What is claimed is:

1. A fluid power linear drive comprising:

a housing having an inner surface defining a piston receiving space;

a piston reciprocally movable within said piston receiving space; and cooperative engagement means provided on said inner surface of said housing and an outer surface of said piston for preventing rotation of said piston relative to said housing, said cooperative engagement means comprising a ball press-fit in an aperture formed in one of said inner surface of said housing and said outer surface of said piston and a longitudinal groove formed in the other of said inner surface of said housing and said outer surface of said piston, wherein said ball slides within said groove.

2. A fluid power linear drive as defined in claim 1, wherein said aperture is provided on said inner surface of said housing and said groove is provided on said outer surface of said piston.

3. A fluid power linear drive as defined in claim 1, wherein said aperture is provided on said outer surface of said piston and said groove is provided on said inner surface of said housing.

4. A fluid power linear drive as defined in claim 1, wherein said longitudinal groove is defined by a bottom wall and two side walls extending from said bottom wall.

5. A fluid power linear drive as defined in claim 1, wherein said piston is provided with two longitudinally spaced seals and said cooperative engagement means is provided on said piston between said seals.

6. A fluid power linear drive comprising:

a housing having an inner surface defining a piston receiving space and a piston rod receiving space;

a piston reciprocally movable within said piston receiving space;

a piston rod axially connected to said piston for reciprocal movement therewith, said piston rod extending through said piston rod receiving space and having an outer surface; and cooperative engagement means provided on said inner surface of said piston rod receiving space and said outer surface of said piston rod for preventing said piston rod from rotating within said piston rod receiving space, wherein said engagement means does not extend beyond an outer periphery of said housing, said cooperative engagement means comprising a ball seated within an aperture and a longitudinal groove, wherein said ball is press-fit in said aperture so that said ball slides within said groove.

7. A fluid power linear drive as defined in claim 6, wherein said cylinder housing comprises a piston rod bearing defining said piston rod receiving space.

8. A fluid power linear drive as defined in claim 6, wherein said aperture is provided on said inner surface of said piston rod receiving space and said groove is provided on said outer surface of said piston rod.

9. A fluid power linear drive as defined in claim 6, wherein said aperture is provided on said outer surface of said piston rod and said groove is provided on said inner surface of said piston rod receiving space.

10. A fluid powered linear drive as defined in claim 6, wherein said longitudinal groove is defined by a bottom wall and two side walls extending from said bottom wall.

11. A method for guiding a piston reciprocally movable within a piston receiving space of a fluid power linear drive housing, the method comprising the steps of:

providing a radially extending projection means on one of an inner surface of said housing piston receiving space and an outer surface of said piston, said projection means comprising a ball press-fit within an aperture; and cooperatively engaging said projection means with a longitudinal groove formed on the other of said inner surface of said housing piston receiving space and said outer surface of said piston, wherein said ball slides within said groove for preventing said piston from rotating within said piston receiving space.

12. A method as defined in claim 11, wherein said piston is provided with two longitudinally spaced seals and said longitudinal groove is formed in said piston between said seals.

* * * * *